(12) United States Patent
Kuwayama (10) Patent No.: US 12,083,833 B2
(45) Date of Patent: Sep. 10, 2024

(54) PNEUMATIC RADIAL TIRE FOR PASSENGER VEHICLES

(71) Applicant: BRIDGESTONE CORPORATION, Tokyo (JP)

(72) Inventor: Isao Kuwayama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 253 days.

(21) Appl. No.: 17/294,026

(22) PCT Filed: Jul. 8, 2019

(86) PCT No.: PCT/JP2019/027038
§ 371 (c)(1),
(2) Date: May 14, 2021

(87) PCT Pub. No.: WO2020/121567
PCT Pub. Date: Jun. 18, 2020

(65) Prior Publication Data
US 2022/0001706 A1     Jan. 6, 2022

(30) Foreign Application Priority Data
Dec. 13, 2018   (JP) ................................ 2018-233181

(51) Int. Cl.
*B60C 3/04*     (2006.01)
*B60C 9/08*     (2006.01)
*B60C 19/00*     (2006.01)

(52) U.S. Cl.
CPC ............. *B60C 19/002* (2013.01); *B60C 3/04* (2013.01); *B60C 9/08* (2013.01)

(58) Field of Classification Search
CPC .................................................. B60C 19/002
See application file for complete search history.

(56) References Cited

U.S. PATENT DOCUMENTS 7,717,146 B2    5/2010    Yukawa et al.
8,794,281 B2    8/2014    Yukawa
(Continued)

FOREIGN PATENT DOCUMENTS

CN         1775573 A      5/2006
CN     101437696 A      5/2009
(Continued)

OTHER PUBLICATIONS

English machine translation of WO 2018/230146 A1, Dec. 20, 2018.*
(Continued)

*Primary Examiner* — Adrienne C. Johnstone
(74) *Attorney, Agent, or Firm* — KENJA IP LAW PC (57) ABSTRACT

A pneumatic radial tire for passenger vehicles of the present disclosure includes a carcass toroidally spanning between a pair of bead portions and including plies of radially arranged cords. A sectional width SW (mm) and an outer diameter OD (mm) of the tire satisfy a predetermined relational expression. At least one noise reducer is provided on an inner surface of the tire. The noise reducer is provided at least in the center region and the shoulder region. Among thicknesses of the noise reducer measured in a direction perpendicular to the inner surface of the tire, a maximum thickness Ts in the shoulder regions is larger than a maximum thickness Tc in the center region.

10 Claims, 5 Drawing Sheets

(56) References Cited

U.S. PATENT DOCUMENTS

| | | | |
|---|---|---|---|
| 8,999,093 | B2 | 4/2015 | Yukawa |
| 10,226,966 | B2 | 3/2019 | Kuwayama et al. |
| 10,245,901 | B2 | 4/2019 | Kim et al. |
| 2010/0307655 | A1 | 12/2010 | Tanno |
| 2011/0041309 | A1 | 2/2011 | Shepler |
| 2011/0308677 | A1 | 12/2011 | Kamprath et al. |
| 2012/0247637 | A1 | 10/2012 | Tanaka et al. |
| 2014/0290819 | A1* | 10/2014 | Kuwayama ............... B60C 3/04 152/454 |
| 2019/0160890 | A1 | 5/2019 | Shinzawa |
| 2019/0176543 | A1 | 6/2019 | Hoshiba |

FOREIGN PATENT DOCUMENTS

| | | | |
|---|---|---|---|
| CN | 103764410 A | | 4/2014 |
| DE | 10 2015 115 774 A1 * | | 4/2017 |
| EP | 2724871 A1 | | 4/2014 |
| EP | 2937231 A1 | | 10/2015 |
| EP | 3760455 A1 * | | 1/2021 ........... B60C 19/002 |
| JP | 2003285607 A | | 10/2003 |
| JP | 2004082947 A * | | 3/2004 |
| JP | 2005254924 A | | 9/2005 |
| JP | 2005262920 A | | 9/2005 |
| JP | 2005297858 A | | 10/2005 |
| JP | 2006143021 A | | 6/2006 |
| JP | 2007161029 A | | 6/2007 |
| JP | 2007326555 A | | 12/2007 |
| JP | 2010195116 A * | | 9/2010 |
| JP | 2011042363 A | | 3/2011 |
| JP | 2011235667 A * | | 11/2011 |
| JP | 2015209198 A | | 11/2015 |
| JP | 2016074280 A | | 5/2016 |
| JP | 2018008618 A | | 1/2018 |
| KR | 1020150123684 A | | 11/2015 |
| KR | 101856095 B1 * | | 5/2018 |
| WO | 2012176476 A1 | | 12/2012 |
| WO | 2018025853 A1 | | 2/2018 |
| WO | WO-2018/230146 A1 * | | 12/2018 |

OTHER PUBLICATIONS

English machine translation of JP 2004-82947 A, Mar. 18, 2004.*
English machine translation of DE 10 2015 115 774 A1, Apr. 6, 2017.*
English machine translation of KR 10-1856095 B1, May 10, 2018.*
English machine translation of JP 2010-195116 A, Sep. 9, 2010.*
English machine translation of JP 2011-235667 A, Nov. 24, 2011.*
Oct. 1, 2019, International Search Report issued in the International Patent Application No. PCT/JP2019/027038.
Jun. 8, 2021, International Preliminary Report on Patentability issued in the International Patent Application No. PCT/JP2019/027038.
Jul. 5, 2022, search result of Office Action issued by the China National Intellectual Property Administration in the corresponding Chinese Patent Application No. 201980082010.5.
Sep. 5, 2022, search result of the Extended European Search Report issued by the European Patent Office in the corresponding European Patent Application No. 19894668.3.

* cited by examiner

PNEUMATIC RADIAL TIRE FOR PASSENGER VEHICLES

TECHNICAL FIELD

The present disclosure relates to a pneumatic radial tire for passenger vehicles.

BACKGROUND

The Applicant proposes a variety of narrow-width large-diameter pneumatic radial tires for passenger vehicles with a sectional width SW of the tire and an outer diameter OD of the tire being in a predetermined relationship (for example, PTL 1).

Here, there is a demand for reducing tire noises of pneumatic radial tires for passenger vehicles (in particular, pneumatic radial tires for electric vehicles). In this regard, a known example of the tire noises is a so-called road noise, which is a sound in a frequency range of 50 to 400 Hz generated during running on a road surface. The main cause may be resonance oscillation (cavity resonance) of air or gas caused in a tire cavity. To address this, a known noise reducer formed of a sponge material or the like is disposed on an inner surface of a tire (for example, PTL 2). The noise reducer can convert a vibration energy of air or gas in the tire cavity to a thermal energy, reducing the cavity resonance in the tire cavity.

CITATION LIST

Patent Literature

PTL 1: International Publication No. WO 2012/176476
PTL 2: Japanese Patent Laid-Open No. 2005-254924

SUMMARY

Technical Problem

However, in a case where a noise reducer as described above is disposed on an inner surface of a tire to enhance a noise reduction performance, heat would be retained in the noise reducer, for example, causing an adhesion layer that bonds the noise reducer and the inner surface of the tire to each other to melt after a long duration running with the noise reducer separated from the inner surface of the tire or making a tire part likely to be broken, which results in a reduction in durability. It is thus typically difficult to achieve both noise reduction performance and tire durability.

Accordingly, an object of the present disclosure is to provide a pneumatic radial tire for passenger vehicles that achieves both noise reduction performance and tire durability.

Relevant configurations of the present disclosure are as follows.

In a first aspect, a pneumatic radial tire for passenger vehicles of the present disclosure includes a carcass toroidally spanning between a pair of bead portions, the carcass including plies of radially arranged cords, in which a sectional width SW of the tire is less than 165 (mm) and a ratio SW/OD between the sectional width SW and an outer diameter OD of the tire is 0.26 or less, at least one noise reducer is provided on an inner surface of the tire, assuming that when the tire is mounted on a rim and filled with a prescribed internal pressure in a load-free state, there are defined, in a tire width direction cross section, a center region and shoulder regions, the center region being a tire width direction region accounting for 50% at a tire width direction middle between ground edges, the shoulder regions being tire width direction regions accounting for 25% each on both tire width direction outer sides relative to the center region, the noise reducer is provided on the inner surface of the tire at least in the center region and the shoulder regions, and among thicknesses of the noise reducer measured in a direction perpendicular to the inner surface of the tire, a maximum thickness Ts in the shoulder regions is larger than a maximum thickness Tc in the center region.

Here, the "rim" refers to an approved rim for an applicable size (Measuring Rim according to STANDARDS MANUAL of ETRTO and Design Rim according to YEAR BOOK of TRA), which is listed or will be listed in the future in the industrial standards effective in an area where the tire is to be manufactured and used, i.e., JATMA YEAR BOOK of JATMA (the Japan Automobile Tyre Manufacturers Association) in Japan, STANDARDS MANUAL of ETRTO (The European Tyre and Rim Technical Organisation) in Europe, YEAR BOOK of TRA (The Tire and Rim Association, Inc.) in the USA, or the like (in other words, the above-described "rim" includes sizes that may be included in the above-described industrial standards in the future in addition to the current sizes and examples of the "sizes that will be listed in the future" may include sizes listed as "FUTURE DEVELOPMENTS" in ETRTO 2013). Meanwhile, for a size not listed in the above-described industrial standards, the "rim" refers to a rim having a width corresponding to a bead width of a tire.

The "prescribed internal pressure" refers to an air pressure (maximum air pressure) corresponding to a maximum load capability of a single wheel according to the applicable size and ply rating described in the above-described JATMA or the like. For a size not listed in the above-described industrial standards, the "prescribed internal pressure" refers to an air pressure (maximum air pressure) corresponding to a maximum load capability determined for each vehicle to which a tire is to be attached. A later-described "maximum load" refers to a load corresponding to the above-described maximum load capability.

The "ground edges" refer to both tire width direction edges of a contact patch that comes into contact with a road surface when the above-described tire is mounted on the rim and filled with the prescribed internal pressure and the maximum load is applied thereto.

In a second aspect, a pneumatic radial tire for passenger vehicles of the present disclosure includes a carcass toroidally spanning between a pair of bead portions, the carcass including plies of radially arranged cords, in which a sectional width SW of the tire is 165 (mm) or more and the sectional width SW (mm) and an outer diameter OD (mm) of the tire satisfy a relational expression:

$$OD(mm) \geq 2.135 \times SW(mm) + 282.3,$$

at least one noise reducer is provided on an inner surface of the tire, assuming that when the tire is mounted on a rim and filled with a prescribed internal pressure in a load-free state, there are defined, in a tire width direction cross section, a center region and shoulder regions, the center region being a tire width direction region accounting for 50% at a tire width direction middle between ground edges, the shoulder regions being tire width direction regions accounting for 25% each on both tire width direction outer sides relative to the center region, the noise reducer is provided on the inner surface of the tire at least in the center region and the shoulder regions, and among thicknesses of the noise reducer measured in a direction perpendicular to the inner surface of the tire, a maximum thickness Ts in the shoulder regions is larger than a maximum thickness Tc in the center region.

In a third aspect, a pneumatic radial tire for passenger vehicles of the present disclosure includes a carcass toroidally spanning between a pair of bead portions, the carcass including plies of radially arranged cords, in which a sectional width SW (mm) and an outer diameter OD (mm) of the tire satisfy a relational expression:

$$OD(mm) \geq -0.0187 \times SW(mm)^2 + 9.15 \times SW(mm) - 380,$$

at least one noise reducer is provided on an inner surface of the tire, assuming that when the tire is mounted on a rim and filled with a prescribed internal pressure in a load-free state, there are defined, in a tire width direction cross section, a center region and shoulder regions, the center region being a tire width direction region accounting for 50% at a tire width direction middle between ground edges, the shoulder regions being tire width direction regions accounting for 25% each on both tire width direction outer sides relative to the center region, the noise reducer is provided on the inner surface of the tire at least in the center region and the shoulder regions, and among thicknesses of the noise reducer measured in a direction perpendicular to the inner surface of the tire, a maximum thickness Ts in the shoulder regions is larger than a maximum thickness Tc in the center region.

Advantageous Effect

According to the present disclosure, it is possible to provide a pneumatic radial tire for passenger vehicles that achieves both noise reduction performance and tire durability.

DETAILED DESCRIPTION

Embodiments of the present disclosure will be exemplarily described below in detail with reference to the drawings.

<Pneumatic Radial Tire for Passenger Vehicles>

Figure 1:
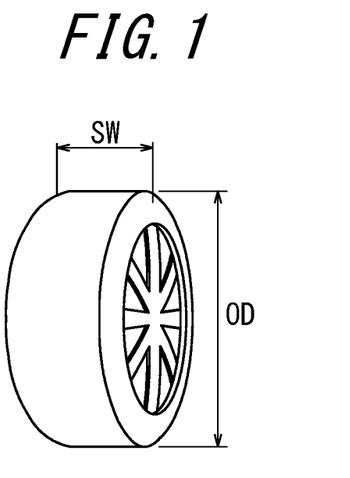
FIG. 1 is a schematic diagram illustrating a sectional width SW and an outer diameter OD of a tire.

FIG. 1 is a schematic diagram illustrating a sectional width SW and an outer diameter OD of a tire A pneumatic radial tire for passenger vehicles (hereinafter, also referred to simply as tire) of an embodiment of a first aspect of the present disclosure is in a shape with a narrow width and a large diameter, in which the sectional width SW of the tire is less than 165 (mm) and a ratio SW/OD between the sectional width SW and the outer diameter OD of the tire is equal to or less than 0.26. A reduction in the sectional width SW of the tire with respect to the outer diameter OD of the tire allows for reducing air resistance and an increase in the outer diameter OD of the tire with respect to the sectional width SW of the tire can make a tread rubber less deformable near a contact patch of the tire to reduce rolling resistance, thereby allowing for improving fuel efficiency of the tire. The above-described SW/OD is preferably equal to or less than 0.25, more preferably equal to or less than 0.24.

The above-described ratio is preferably satisfied at an internal pressure of the tire of 200 kPa or more, more preferably at 220 kPa or more, further preferably at 280 kPa or more. This is because the rolling resistance can be reduced. Simultaneously, the above-described ratio is preferably satisfied at an internal pressure of the tire of 350 kPa or less. This is because ride comfort can be improved.

Here, in terms of ensuring a footprint area, within a range to satisfy the above-described ratio, the sectional width SW of the tire is preferably 105 mm or more, more preferably 125 mm or more, further preferably 135 mm or more, particularly preferably 145 mm or more. Simultaneously, in terms of a reduction in the air resistance, within the range to satisfy the above-described ratio, the sectional width SW of the tire is preferably 155 mm or less. Further, in terms of a reduction in the rolling resistance, within the range to satisfy the above-described ratio, the outer diameter OD of the tire is preferably 500 mm or more, more preferably 550 mm or more, further preferably 580 mm or more. Simultaneously, in terms of a reduction in the air resistance, within the range to satisfy the above-described ratio, the outer diameter OD of the tire is preferably 800 mm or less, more preferably 720 mm or less, further preferably 650 mm or less, particularly preferably 630 mm or less. Further, in terms of a reduction in the rolling resistance, with the sectional width SW and the outer diameter OD of the tire satisfying the above-described ratio, a rim diameter is preferably 16 inches or more, more preferably 17 inches or more, further preferably 18 inches or more. Simultaneously, in terms of a reduction in the air resistance, with the sectional width SW and the outer diameter OD of the tire satisfying the above-described ratio, the rim diameter is preferably 22 inches or less, more preferably 21 inches or less, further preferably 20 inches or less, particularly preferably 19 inches or less. Further, with the sectional width SW and the outer diameter OD of the tire satisfying the above-described ratio, an aspect ratio of the tire is preferably in a range from 45 to 70, more preferably in a range from 45 to 65.

A specific example of the tire size may be, but not limited to, any one of 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R18, 155/70R17, and 155/70R19.

A tire of an embodiment of a second aspect of the present disclosure is in a shape with a narrow width and a large diameter, in which a sectional width SW of the tire is 165 (mm) or more and the sectional width SW (mm) and an outer diameter OD (mm) of the tire satisfy a relational expression:

$$OD(mm) \geq 2.135 \times SW(mm) + 282.3.$$

With the relational expression satisfied, the air resistance can be reduced and the rolling resistance can be reduced, thereby allowing for improving the fuel efficiency of the tire.

It should be noted that in the second aspect, with the sectional width SW and the outer diameter OD of the tire satisfying the relational expression, a ratio SW/OD is preferably 0.26 or less, more preferably 0.25 or less, further preferably 0.24 or less. This is because the fuel efficiency of the tire can be further improved.

The above-described relational expression and/or the ratio is preferably satisfied at an internal pressure of the tire of 200 kPa or more, more preferably at 220 kPa or more, further preferably at 280 kPa or more. This is because the rolling resistance can be reduced. Simultaneously, the above-described relational expression and/or ratio is preferably satisfied at an internal pressure of the tire of 350 kPa or less. This is because ride comfort can be improved.

Here, in terms of ensuring the footprint area, within a range to satisfy the above-described relational expression, the sectional width SW of the tire is preferably 175 mm or more, more preferably 185 mm or more. Simultaneously, in terms of a reduction in the air resistance, within the range to satisfy the above-described relational expression, the sectional width SW of the tire is preferably 230 mm or less, more preferably 215 mm or less, further preferably 205 mm or less, particularly preferably 195 mm or less. Further, in terms of a reduction in the rolling resistance, within the range to satisfy the above-described relational expression, the outer diameter OD of the tire is preferably 630 mm or more, more preferably 650 mm or more. Simultaneously, in terms of a reduction in the air resistance, within the range to satisfy the above-described relational expression, the outer diameter OD of the tire is preferably 800 mm or less, more preferably 750 mm or less, further preferably 720 mm or less. Further, in terms of a reduction in the rolling resistance, with the sectional width SW and the outer diameter OD of the tire satisfying the above-described relational expression, a rim diameter is preferably 18 inches or more, more preferably 19 inches or more. Simultaneously, in terms of a reduction in the air resistance, with the sectional width SW and the outer diameter OD of the tire satisfying the above-described relational expression, the rim diameter is preferably 22 inches or less, more preferably 21 inches or less. Further, with the sectional width SW and the outer diameter OD of the tire satisfying the above-described relational expression, an aspect ratio of the tire is preferably in a range from 45 to 70, more preferably in a range from 45 to 65.

A specific example of the tire size may be, but not limited to, any one of 165/45R22, 165/55R18, 165/55R19, 165/55R20, 165/55R21, 165/60R19, 165/65R19, 165/70R18, 175/45R23, 175/55R19, 175/55R20, 175/55R22, 175/60R18, 185/45R22, 185/50R20, 185/55R19, 185/55R20, 185/60R19, 185/60R20, 195/50R20, 195/55R20, 195/60R19, 205/50R21, 205/55R20, and 215/50R21.

A tire of an embodiment of a third aspect of the present disclosure is in a shape with a narrow width and a large diameter, in which a sectional width SW (mm) and an outer diameter OD (mm) of the tire satisfy a relational expression:

$$OD(mm) \geq -0.0187 \times SW(mm)^2 + 9.15 \times SW(mm) - 380.$$

With the relational expression satisfied, the air resistance can be reduced and the rolling resistance can be reduced, thereby allowing for improving the fuel efficiency of the tire.

It should be noted that in the third aspect, with the sectional width SW and the outer diameter OD of the tire satisfying the relational expression, a ratio SW/OD is preferably 0.26 or less, more preferably 0.25 or less, further preferably 0.24 or less. This is because the fuel efficiency of the tire can be further improved.

The above-described relational expression and/or the ratio is preferably satisfied at an internal pressure of the tire of 200 kPa or more, more preferably at 220 kPa or more, further preferably at 280 kPa or more. This is because the rolling resistance can be reduced. Simultaneously, the above-described relational expression and/or ratio is preferably satisfied at an internal pressure of the tire of 350 kPa or less. This is because ride comfort can be improved.

Here, in terms of ensuring the footprint area, within the range to satisfy the above-described relational expression, the sectional width SW of the tire is preferably 105 mm or more, more preferably 125 mm or more, further preferably 135 mm or more, particularly preferably 145 mm or more. Simultaneously, in terms of a reduction in the air resistance, within the range to satisfy the above-described relational expression, the sectional width SW of the tire is preferably 230 mm or less, more preferably 215 mm or less, further preferably 205 mm or less, particularly preferably 195 mm or less. Further, in terms of a reduction in the rolling resistance, within the range to satisfy the above-described relational expression, the outer diameter OD of the tire is preferably 500 mm or more, more preferably 550 mm or more, further preferably 580 mm or more. Simultaneously, in terms of a reduction in the air resistance, within the range to satisfy the above-described relational expression, the outer diameter OD of the tire is preferably 800 mm or less, more preferably 750 mm or less, further preferably 720 mm or less. Further, in terms of a reduction in the rolling resistance, with the sectional width SW and the outer diameter OD of the tire satisfying the above-described relational expression, a rim diameter is preferably 16 inches or more, more preferably 17 inches or more, further preferably 18 inches or more. Simultaneously, in terms of a reduction in the air resistance, with the sectional width SW and the outer diameter OD of the tire satisfying the above-described relational expression, the rim diameter is preferably 22 inches or less, more preferably 21 inches or less, further preferably 20 inches or less. Further, with the sectional width SW and the outer diameter OD of the tire satisfying the above-described ratio, an aspect ratio of the tire is preferably in a range from 45 to 70, more preferably in a range from 45 to 65.

A specific example of the tire size may be, but not limited to, any one of 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R18, 155/70R17, 155/70R19, 165/45R22, 165/55R18, 165/55R19, 165/55R20, 165/55R21, 165/60R19, 165/65R19, 165/70R18, 175/45R23, 175/55R18, 175/55R19, 175/55R20, 175/55R22, 175/60R18, 185/45R22, 185/50R20, 185/55R19, 185/55R20, 185/60R19, 185/60R20, 195/50R20, 195/55R20, 195/60R19, 205/50R21, 205/55R20, and 215/50R21.

Figure 2:
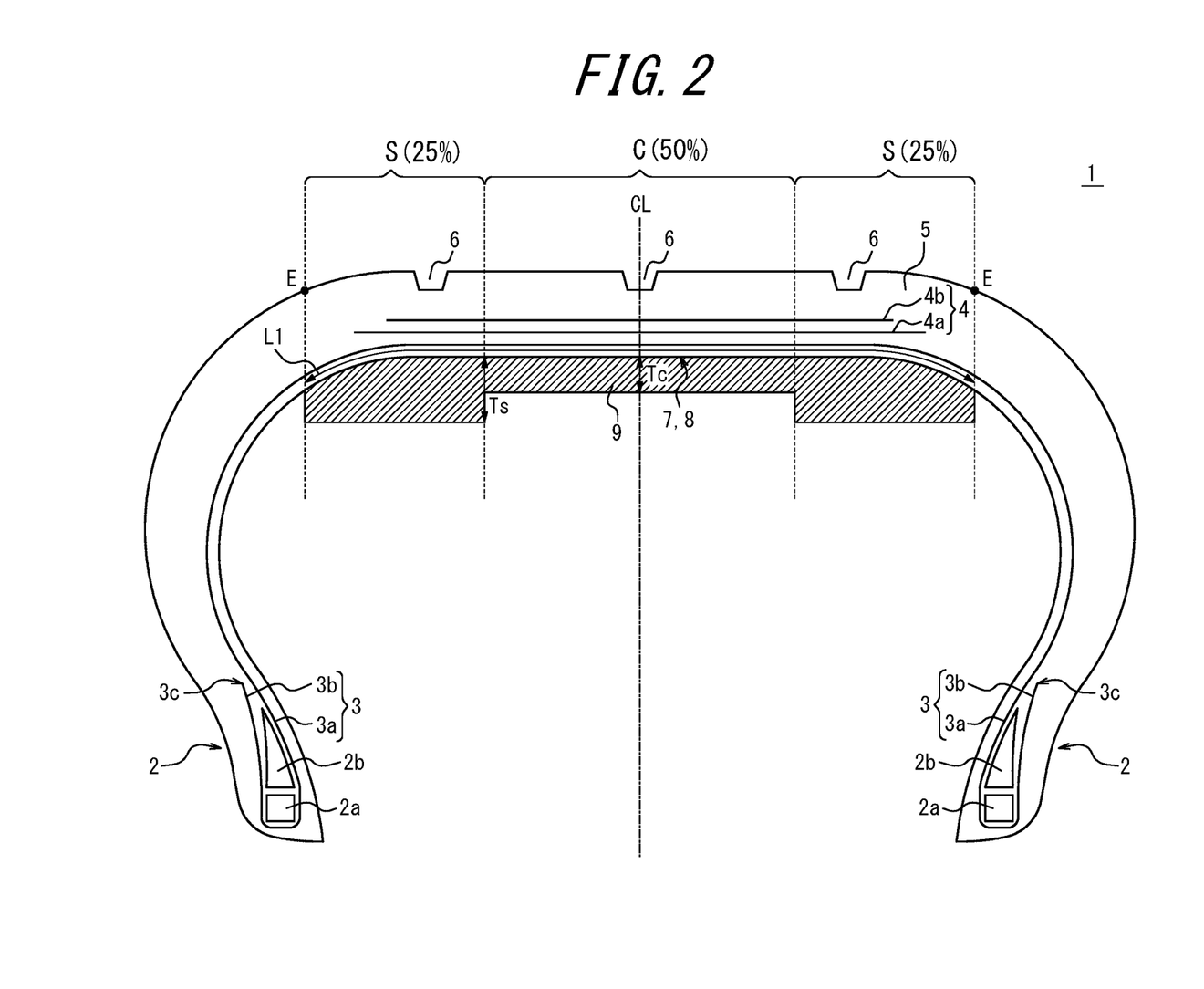
FIG. 2 is a tire width direction cross sectional view, illustrating a pneumatic radial tire for passenger vehicles according to an embodiment of first to third aspects of the present disclosure.

FIG. 2 is a tire width direction cross sectional view, illustrating a pneumatic radial tire for passenger vehicles according to an embodiment of the first to third aspects of the present disclosure. FIG. 2 illustrates a width direction cross section of the tire, the tire being mounted on a rim and filled with a prescribed internal pressure with no load applied. As illustrated in FIG. 2, the tire 1 includes a carcass 3 toroidally spanning between a pair of bead portions 2 and including plies of radially arranged cords. The tire 1 also includes a belt 4 and a tread 5 in sequence on a tire radial outer side of the carcass 3, the belt 4 including two belt layers 4a and 4b in the example illustrated.

In this example, a bead core 2a is embedded in each of the pair of bead portions 2. In the present disclosure, a cross-sectional shape and a material of the bead core 2a are not limited and may have a configuration typically usable for pneumatic radial tires for passenger vehicles. In the present disclosure, the bead core 2a may be divided into a plurality of small-sized bead cores. Alternatively, in the present disclosure, no bead core 2a may be provided.

The tire 1 of the example illustrated includes a bead filler 2b substantially in a triangular shape in a cross section on a tire radial outer side of the bead core 2a. A cross-sectional shape of the bead filler 2b is not limited to this example and a material thereof is not limited, either. Alternatively, no bead filler 2b may be provided so that the tire is reduced in weight.

In the present embodiment, a tire width direction cross-sectional area S1 of the bead filler 2b is preferably one to four times as large as a tire width direction cross-sectional area S2 of the bead core 2a. With the above-described cross-sectional area S1 being one or more times as large as the above-described cross-sectional area S2, a rigidity of the bead portion 2 can be ensured. With the above-described cross-sectional area S1 being four or less times as large as the above-described cross-sectional area S2, the tire can be reduced in weight to further improve the fuel efficiency. Further, in the present embodiment, a ratio Ts/Tb between a gauge Ts of a sidewall portion at a tire maximum width position (i.e., a tire radial position where a width in the tire width direction is maximized or, if it is a tire radial region, a tire radial center position) and a bead width (a width in the tire width direction of the bead portion 2) Tb at the tire radial center position of the bead core 2a is preferably in a range from 15% to 40%. With the above-described ratio Ts/Tb being 15% or more, the rigidity of the sidewall portion can be ensured. With the above-described ratio Ts/Tb being 40% or less, the tire can be reduced in weight to further improve the fuel efficiency. It should be noted that the gauge Ts is a total of thicknesses of all the members such as a rubber, a reinforcement member, and an inner liner (however, even in a case where a noise reducer 9 is disposed on an inner surface of the sidewall portion, a thickness of the noise reducer 9 is not included). Here, the "sidewall portion" refers to, in a tire width direction cross section, a region between a tire radial virtual line passing through a ground edge E and a tire width direction virtual line passing through a tire radial outer edge of the bead portion (in a case a bead filler is provided, a tire radial outermost edge of a bead filler, or in a case where no bead filler is provided, a tire radial outer edge of the bead core). Further, in a case where the bead core 2a is divided into a plurality of small-sized bead cores by the carcass 3, Tb denotes a distance between, among all the bead cores, tire width direction innermost edge portion and outermost edge portion. Further, in the present embodiment, a ratio Ts/Tc between the gauge Ts of the sidewall portion at the tire maximum width position and a diameter Tc of a carcass cord is preferably in a range from 5 to 10. With the above-described Ts/Tc ratio being 5 or more, a rigidity of the sidewall portion can be ensured. With the above-described ratio Ts/Tc being 10 or less, the tire can be reduced in weight to further improve the fuel efficiency.

In the present embodiment, the tire maximum width position can be provided, for example, on a tire radial outer side relative to a bead base line (a virtual line parallel with the tire width direction and that passes through a bead base) at a height ratio in a range from 50% to 90% in a tire cross section.

Here, the "bead portion" refers to, in a case where a bead filler is provided, a portion in a tire radial region from a rim base line to a tire radial outermost edge of the bead filler and, in a case where no bead filler is provided, refers to a portion in a tire radial region from the rim base line to a tire radial outermost edge of a bead core.

In the present embodiment, the tire 1 may include a rim guard. Moreover, in the present embodiment, the bead portion 2 may further be provided with an additional member such as a rubber layer or a cord layer for the purpose of reinforcement or the like. Such an additional member may be provided at various positions relative to the carcass 3 or the bead filler 2b.

In the example illustrated in FIG. 2, the carcass 3 includes a single carcass plie. However, in the present disclosure, the number of carcass plies is not limited and may be two or more. Further, in the example illustrated in FIG. 2, the carcass 3 includes a carcass body 3a toroidally spanning between the pair of bead portions 2 and a folded-up portion 3b folded up from the carcass body 3a around each of the bead cores 2a. Alternatively, in the present disclosure, the carcass folded-up portion 3b may be wound on the bead core 2a or sandwiched between the plurality of divided small-sized bead cores. In the example illustrated, an end 3c of the carcass folded-up portion 3b is located on a tire radial outer side with respect to a tire radial outer edge of the bead filler 2b and on a tire radial inner side with respect to the tire maximum width position. This enables reducing the weight of the tire with the rigidity of the sidewall portion ensured. Alternatively, in the present disclosure, the end 3c of the carcass folded-up portion 3b may be located on a tire radial inner side with respect to the tire radial outer edge of the bead filler 2b or may be located on a tire radial outer side with respect to the tire maximum width position.

Alternatively, an envelope structure may be employed, where the end 3c of the carcass folded-up portion 3b is located on a tire width direction inner side with respect to an edge of the belt 4 (for example, an edge of the belt layer 4b) to be located between the carcass body 2a and the belt 4 in the tire radial direction. Further, in a case where the carcass 3 includes a plurality of carcass plies, positions (for example, tire radial positions) of the ends 3c of the carcass folded-up portions 3b of the carcass plies may be the same or different. The number of ends of cords of the carcass 3 is not limited and may be, for example, in a range from 20 to 60 cords/50 mm. Further, a variety of structures may be employed for the carcass line. For example, the carcass maximum width position may be closer to the bead portion 2 or to the tread 5 in the tire radial direction. For example, the carcass maximum width position may be provided on the tire radial outer side relative to the bead base line at a height ratio in a range from 50% to 90% in a tire cross section. The above-described "radial arrangement" is 85° or more relative to a tire circumferential direction, preferably 90° with respect to the tire circumferential direction.

The tire of the present embodiment preferably incudes one or more inclined belt layers each in the form of a cord layer coated with rubber extending with inclination relative to the tire circumferential direction, most preferably two of such layers in terms of a balance between weight reduction and reduction in deformation of a shape of the contact patch. It should be noted that the number of the belt layers may be one in terms of weight reduction or may be three or more in terms of a reduction in deformation of the shape of the contact patch. In the example illustrated in FIG. 2, a width in the tire width direction of, out of the two belt layers 4a and 4b, the belt layer 4b on the tire radial outer side is smaller than a width in the tire width direction of the belt layer 4a on the tire radial inner side. Alternatively, the width in the tire width direction of the belt layer 4b on the tire radial outer side may be larger than or the same as the width in the tire width direction of the belt layer 4a on the tire radial inner side. The width in the tire width direction of the belt layer having the largest width in the tire width direction (in the example illustrated, the belt layer 4a) is preferably in a range from 90 to 115% of a ground contact width, particularly preferably in a range from 100 to 105% of the ground contact width. It should be noted that the "ground contact width" refers to a distance in the tire width direction between the above-described ground edges E on the above-described contact patch.

In the present embodiment, a belt cord of each of the belt layers 4a and 4b is most preferably a metal cord, especially, a steel cord, but may be an organic fiber cord. The steel cord, which contains steel as a main component, may contain a variety of trace ingredients such as carbon, manganese, silicon, phosphorus, sulfur, copper, and chrome. In the present embodiment, the belt cord of each of the belt layers 4a and 4b may be a monofilament cord, a cord provided by drawing a plurality of filaments into alignment, or a cord provided by twisting a plurality of filaments. It is possible to apply a variety of twist structures, in which a cross sectional structure, a twist pitch, a twist direction, a distance between adjacent filaments, etc. may be various. It is also possible to use a cord provided by twisting filaments different in material, which is not limited in cross sectional structure and may have a variety of twist structures such as single twist, layer twist, and multi twist.

In the present embodiment, an inclination angle of the belt cord of each of the belt layers 4a and 4b is preferably 100 or more with respect to the tire circumferential direction. In the present embodiment, the inclination angle of the belt cord of each of the belt layers 4a and 4b is preferably a high angle, which is specifically 200 or more, preferably 350 or more, with respect to the tire circumferential direction, particularly preferably in a range from 55° to 85° with respect to the tire circumferential direction. With the inclination angle being 200 or more (preferably, 350 or more), a rigidity against the tire width direction can be enhanced with a steering stability, especially during cornering, improved. Further, a shearing deformation of a rubber between layers is reduced, which allows for reducing a rolling resistance.

The tire of the present embodiment is provided with, on the tire radial outer side of the belt 4, none of one or more circumferential belt layers each including a cord extending substantially along the tire circumferential direction. Alternatively, in the present disclosure, a circumferential belt including one or more circumferential belt layers may be provided on the tire radial outer side of the belt 4. In particular, in a case where inclination angles θ1 and θ2 of the belt cords of the belt layers 4a and 4b of the belt 4 are 350 or more, it is preferable that a circumferential belt be provided and that the circumferential belt exhibit a higher tire circumferential rigidity per unit width in a center region C than a tire circumferential rigidity per unit width in each of shoulder regions S.

It should be noted that when the tire is mounted on the rim and filled with the prescribed internal pressure in a load-free state, there are defined, in a tire width direction cross section, a center region C and shoulder regions S, the center region C being a tire width direction region accounting for 50% at a tire width direction middle between the ground edges E, the shoulder regions S being regions accounting for 25% each on both tire width direction outer sides relative to the center region.

For example, with the number of the circumferential belt layers in the center region C increased more than in the shoulder regions S, a tire circumferential rigidity per unit width in the center region C can be higher than a tire circumferential rigidity per unit width in the shoulder regions S. Here, many of tires with the belt cord of each of the belt layers 4a and 4b inclined at 350 or more with respect to the tire circumferential direction have a shape causing a tread surface to evenly considerably vibrate in a high frequency area of 400 Hz to 2 kHz in, for example, a primary, secondary, tertiary vibration mode in a cross sectional direction, thus causing a large noise emission. Accordingly, the tire circumferential rigidity of the center region C of the tread 5 is locally increased, which makes the center region C of the tread 5 unlikely to stretch in the tire circumferential direction. As a result of reducing the stretch of the tread surface in the tire circumferential direction, noise emission can be reduced.

In the present embodiment, it is also preferable that the inclination angle θ1 of the belt cord of the belt layer having the largest width in the tire width direction (in the example illustrated, the belt layer 4a) relative to the tire circumferential direction and the inclination angle θ2 of the belt cord of the belt layer having the smallest width in the tire width direction (in the example illustrated, the belt layer 4b) relative to the tire circumferential direction satisfy $35°\leq θ1 \leq 85°$, $10°\leq θ2 \leq 30°$, and $θ1 \geq θ2$. Many of tires including belt layers with belt cords inclined at 35° or more with respect to the tire circumferential direction have a shape causing a tread surface to evenly considerably vibrate in a high frequency area of 400 Hz to 2 kHz in, for example, a primary, secondary, tertiary vibration mode in a cross sectional direction, thus causing a large noise emission. Accordingly, the tire circumferential rigidity of the center region C of the tread 5 is locally increased, which makes the center region C of the tread 5 unlikely to stretch in the tire circumferential direction. As a result of reducing the stretch of the tread surface in the tire circumferential direction, noise emission can be reduced.

Here, in the present embodiment, in a case where the circumferential belt is provided, it is preferable that the circumferential belt layer exhibit a high rigidity. More specifically, it is preferable that the circumferential belt layer include a cord layer coated with rubber extending in the tire circumferential direction and satisfy $1500 \geq X \geq 225$ when it is defined that $X=Y \times n \times m \times d$, where Y (GPa) denotes a Young's modulus of the cord, n denotes the number of ends (ends/50 mm), m layer denotes the circumferential belt layer, and d (mm) denotes a cord diameter. A narrow-width large-diameter size pneumatic radial tire for passenger vehicles is likely to be locally deformed in the tire circumferential direction in response to an input of force from a road surface during a cornering situation, causing a contact patch to be substantially in a triangular shape, that is, a shape having a circumferential ground contact length considerably changeable depending on a position in the tire width direction. In contrast, the circumferential belt layer with a high rigidity serves to improve a ring rigidity of the tire to reduce deformation in the tire circumferential direction. This results in also reducing deformation in the tire width direction by virtue of incompressibility of rubber, making a ground contact area unlikely to change. In addition, an eccentric deformation is accelerated by virtue of the improvement in the ring rigidity, also improving the rolling resistance at the same time. Further, in a case where the circumferential belt layer with a high rigidity is used as described above, it is preferable that the inclination angle of the belt cord of each of the belt layers 4a and 4b relative to the tire circumferential direction be a high angle, specifically, 350 or more. In a case where the circumferential belt layer with a high rigidity is used, some tires are reduced in ground contact length due to an increase in the rigidity in the tire circumferential direction.

Accordingly, the belt layer with a high angle is used to reduce an out-of-plane bending stiffness in the tire circumferential direction and increase elongation of the rubber in the tire circumferential direction resulting from road surface deformation, which makes the ground contact length less reducible. Further, in the present embodiment, the circumferential belt layer may include a wavy-shaped cord to enhance rupture strength. Likewise, to enhance the rupture strength, the circumferential belt layer may include a high elongation cord (for example, elongation at rupture is 4.5 to 5.5%). Further, in the present embodiment, a variety of materials are usable for the circumferential belt layer and typical examples thereof include rayon, nylon, polyethylene, naphthalate (PEN), polyethylene terephthalate (PET), aramid, glass fiber, carbon fiber, and steel. In terms of weight reduction, an organic fiber cord is particularly preferable. Here, in the present embodiment, in a case where the circumferential belt is provided, the cord of the circumferential belt layer may be a monofilament cord, a cord provided by drawing a plurality of filaments into alignment, a cord provided by twisting a plurality of filaments, or even a hybrid cord provided by twisting filaments different in material. Further, in the present embodiment, the number of ends in the circumferential belt layer may be, but not limited to, in a range from 20 to 60/50 mm. Further, in the present embodiment, distributions in rigidity, material, the number of layers, an end density, etc. in the tire width direction are acceptable. For example, the number of the circumferential belt layers may be increased only in the shoulder portions S or, inversely, the number of circumferential belt layers may be increased only in the center region C. Further, in the present embodiment, the width in the tire width direction of the circumferential belt layer may be larger or smaller than or the same as those of the belt layers 4a and 4b. For example, the width in the tire width direction of the circumferential belt layer may be in a range from 90% to 110% of the width in the tire width direction of, out of the belt layers 4a and 4b, the belt layer having the largest width in the tire width direction (in the example illustrated, the belt layer 4a). Here, it is especially favorable that the circumferential belt layer be in the form of a spiral layer in terms of manufacturing.

In the example illustrated, a tread rubber providing the tread 5 is in the form of a single layer. Alternatively, in the present embodiment, the tread rubber providing the tread 5 may be formed by stacking a plurality of different rubber layers in the tire radial direction. Rubber layers different in loss tangent, modulus, hardness, glass transition temperature, material, etc. are usable as the above-described plurality of rubber layers. In addition, a ratio of a thickness in the tire radial direction of the plurality of rubber layers may vary in the tire width direction and only a bottom of a circumferential main groove or the like may be a rubber layer different from surroundings thereof. In addition, the tread rubber providing the tread 5 may include a plurality of rubber layers different in the tire width direction. Rubber layers different in loss tangent, modulus, hardness, glass transition temperature, material, etc. are usable as he above-described plurality of rubber layers. In addition, a ratio of a width in the tire width direction of the plurality of rubber layers may vary in the tire radial direction and only a limited partial region such as only a vicinity of the circumferential main groove, only a vicinity of the ground edges, only a shoulder land portion, or only a center land portion may be a rubber layer different from surroundings thereof.

Further, in the present embodiment, in a tire width direction cross section, it is preferable that a ratio $L_{CR}/W$ be 0.045 or less, where a straight line passing through a point P on a tread surface in a tire equator plane CL is denoted by m1, a straight line passing through the ground edge E and parallel with the tire width direction is denoted by m2, a distance in the tire radial direction between the straight line m1 and the straight line m2 is defined as a drop height $L_{CR}$, and a ground contact width of the tire is denoted by W. With the ratio $L_{CR}/W$ falling within the above-described range, a crown portion of the tire is flattened (planarized), increasing the footprint area and relaxing input of force (pressure) from the road surface. This reduces a ratio of deflation in the tire radial direction to improve the durability and wear resistance of the tire.

In the example illustrated, the tire 1 has three circumferential main grooves 6 extending in the tire circumferential direction. Specifically, one circumferential main groove 6 is provided on the tire equator plane CL and one circumferential main groove 6 is provided in each of the shoulder regions S on both tire width direction sides thereof. A groove width (opening width) of the circumferential main grooves 6 may be, but not limited to, in a range from 2 mm to 5 mm, for example.

In the present embodiment, it is preferable that a proportion of grooves to the tread 5 be reduced in terms of achieving both a wet performance and any other performance. Specifically, a groove volume ratio (groove volume V2/tread rubber volume V1) is preferably 30% or less and a negative ratio (a ratio of a groove area to an area of the tread surface) is preferably 30% or less.

As described later, in a narrow-width large-diameter pneumatic radial tire for passenger vehicles, heat buildup in the center region C is likely to become relatively large due to a ground contact pressure in the center region C being high as compared with in the shoulder regions S. Accordingly, as in the present embodiment, the one circumferential main groove 6 is provided in the center region C (in the example illustrated, on the tire equator plane CL), which allows for efficiently releasing heat. Further, in the present embodiment, the noise reducer 9 (a sponge material) is provided on an inner surface 7 of the tire in each of the respective shoulder regions S in half portions in the tire width direction, a boundary between which is the tire equator plane CL, as described later. This allows for efficiently releasing heat by virtue of the one or more (in the example, one) circumferential main grooves 6 provided in each of the shoulder regions S.

In contrast, in a tire with a rigidity of the center region C in the tire circumferential direction enhanced by a belt structure or the like, it is also preferable for the tread 5 to have a land portion continuous in the tire circumferential direction in a region of the tread surface including at least the tire equator plane CL in terms of ensuring the ground contact length to improve a performance for cornering.

In the present disclosure, the number and location of the circumferential main grooves 6 are not particularly limited to the above-described example. Further, a width direction groove extending in the tire width direction, a sipe to be closed during ground contact, etc., may be provided, if necessary.

Further, in terms of achieving both a noise performance and the wet performance, a cross-sectional area of each of the circumferential main grooves is preferably in a range from 24 mm² to 96 mm² and, simultaneously, the number of the circumferential main grooves is preferably in a range from 2 to 5. Thus, a sum of the cross-sectional areas of the circumferential main grooves in the entire tread surface is preferably in a range from 48 mm² to 480 mm².

The tire 1 of the present embodiment includes an inner liner 8 on the inner surface 7 of the tire (hereinafter, also referred to simply as tire inner surface 7). A thickness of the inner liner 8 is preferably in a range from 1.5 mm to 2.8 mm, approximately. This allows for effectively reducing 80 to 100 Hz in-vehicle noises. A coefficient of air permeability of a rubber composition of the inner liner 8 is preferably in a range from $1.0 \times 10^{-14}$ cc·cm/(cm²·s·cmHg) to $6.5 \times 10^{-10}$ cc·cm/(cm²·s·cmHg). Further, it is preferable that one or more fluorine-containing particles with a maximum diameter of 1.0 μm or more be contained per a 100 μm² region in the tire inner surface and that a plurality of bladder ridges extending in the tire width direction be formed on a circumference of the tire inner surface and five or more of the bladder ridges be formed in the tire inner surface at any position in the tire width direction per inch in the tire circumferential direction.

In the present embodiment, the inner liner 8 may be formed of a rubber layer containing a butyl rubber as a main component or a film layer containing a resin as a main component. In the present embodiment, a sealant member for preventing air leakage at puncturing may be provided at a portion of the tire inner surface 7 where the noise reducer 9 is not disposed.

As illustrated in FIG. 2, the tire 1 of the present embodiment includes at least one (in the example illustrated, one) noise reducer 9 on the tire inner surface 7 (in this example, an inner surface of the inner liner 8). In this example, the noise reducer 9 is a sponge material.

In the present embodiment, the noise reducer 9 is provided on the tire inner surface 7 at least in the center region C and the shoulder regions S, being, in the example illustrated, provided across the entirety of the tire inner surface 7 in the center region C and the respective shoulder regions S in the half portions in the tire width direction.

It should be noted that in the present disclosure, the noise reducer 9 only has to be provided on the tire inner surface 7 in the center region C and the shoulder regions S. For example, a tire width direction edge of the noise reducer 9 may be located on a tire width direction inner side relative to the ground edges E or, for example, the plurality of noise reducers 9 may be individually provided on the tire inner surface 7 in a part of the center region C and parts of the shoulder regions S.

In the present embodiment, the noise reducer 9 is bonded to the tire inner surface 7 (in the example illustrated, across the entirety thereof) in the center region C and the respective shoulder regions S in the half portions in the tire width direction via an adhesion layer (not illustrated).

Any known adhesion layer is usable. Alternatively, the noise reducer 9 may be bonded by fusion bonding or the like. Further, the noise reducer 9 and the tire inner surface 7, which may be bonded to each other, for example, only at parts of the above-described region, are preferably bonded to each other across the entirety of the tire inner surface 7 in the center region C and the respective shoulder regions S in the half portions in the tire width direction to ensure adhesiveness as in the present example. It should be noted that in a case where the tire inner surface 7 is provided with no inner liner 8, for example, the noise reducer 9 may be bonded directly to the tire inner surface 7.

Further, in a continuously extending region, the noise reducer 9 is preferably provided by a single noise reducer 9 but may be provided by two or more noise reducers 9 bonded by an adhesion layer or the like.

In the present embodiment, no noise reducer 9 is provided on the tire inner surface 7 in a region on a tire width direction outer side relative to each of the respective shoulder regions S in the half portions in the tire width direction.

In the present embodiment, the noise reducer 9 provided on the inner surface 7 at each of the respective shoulder regions S in the half portions of the tire width direction continuously extends in the tire circumferential direction. It should be noted that although the noise reducer 9 is not divided in the tire circumferential direction in the example illustrated, two or more noise reducers 9 divided in the tire circumferential direction may be bonded in the tire circumferential direction by an adhesion layer or the like. Alternatively, the noise reducer 9 may discontinuously extend in the tire circumferential direction. In this case, in terms of an improvement in noise reduction performance, it is preferable that the noise reducer 9 extend across a tire circumferential region accounting for, in total, 80% or more of an entire tire circumferential region. Further, in a case where the noise reducer 9 discontinuously extends in the tire circumferential direction, in terms of an improvement in circumferential uniformity of the tire, it is preferable that the noise reducers 9 with the same circumferential length be arranged at circumferential pitches at regular intervals.

As illustrated in FIG. 2, in the present embodiment, a cross-sectional shape of the noise reducer 9 is a substantially quadrangular shape (however, a side bonded to the tire inner surface 7 is along the shape of the tire inner surface) in each of the center region C and the shoulder regions S. In the center region C, the noise reducer 9 is substantially constant in thickness, having a maximum thickness Tc on the tire equator plane CL. In each of the shoulder regions S, the noise reducer 9 is gradually increased in thickness toward the tire width direction inner side, having a maximum thickness Ts at a position of a tire width direction inner edge of the shoulder region S.

In the present embodiment, among thicknesses of the noise reducer 9 measured in a direction perpendicular to the tire inner surface 7, the maximum thickness Ts in the shoulder regions S is larger than the maximum thickness Tc in the center region C.

It should be noted that in the present disclosure, the cross-sectional shape of the noise reducer 9 may be any shape, examples of which include other polygonal shapes such as a rectangular shape, a trapezoidal shape, a circular shape, and an oval shape.

It should be noted that in the present embodiment, the cross-sectional shape and size of the noise reducer 9 are the same in any tire width direction cross section but may be changed in the tire circumferential direction.

It is preferable that a volume of the noise reducer 9 be in a range from 0.1% to 80% of a total volume of a tire cavity. With the volume of the noise reducer 9 being 0.1% or more relative to the total volume of the tire cavity, an effect in reducing cavity resonance noise can be effectively obtained. With the volume of the noise reducer 9 being 80% or less relative to the total volume of the tire cavity, weight increase attributed to the noise reducer 9 can be reduced. In addition, this allows for keeping heat from being retained in the noise reducer 9. For the similar reasons, the volume of the noise reducer 9 is more preferably in a range from 5 to 70% of the total volume of the tire cavity, further preferably in a range from 15 to 50%.

Although dimensions, etc. are provided for convenience in the figure illustrating a state where the tire is mounted on the rim and filled with the prescribed internal pressure, the volume and later-described width, thickness, aspect ratio, cross-sectional area, peripheral length, etc., of the noise reducer are determined in a state where the tire is removed from the rim at ordinary temperature under ordinary pressure.

Here, in FIG. 2, the peripheral length of the noise reducer 9 along the tire inner surface 7 is denoted by Li (mm).

In the present embodiment, an aspect ratio Ts/L1 of the noise reducer 9 is preferably in a range from 0.2 to 0.8. With the aspect ratio being 0.2 or more, the thickness Ts is increased with respect to the peripheral length L1 to ensure the volume of the noise reducer 9, which allows for further improving the noise reduction performance. With the aspect ratio being 0.8 or less, the thickness Ts is reduced with respect to the peripheral length L1 to keep heat from being retained in the noise reducer 9, which allows for further improving the tire durability. For the similar reasons, the aspect ratio is more preferably in a range from 0.3 to 0.6.

For example, the maximum thickness Tc of the noise reducer 9 in the center region C may be in a range from 2 to 20 mm within the above-described range of the aspect ratio Ts/L1. Further, for example, the maximum thickness Ts of the noise reducer in each of the shoulder regions S may be in a range from 5 to 40 mm within the above-described range of the aspect ratio Ts/L1.

Further, a ratio SI ($mm^2$)/Ts (mm) is preferably in a range from 30 to 150, where S I ($mm^2$) denotes the cross-sectional area of each of the noise reducers 9. With the ratio SI ($mm^2$)/Ts (mm) being 30 or more, the cross-sectional area SI is increased with respect to the thickness Ts, which allows for further improving the noise reduction performance. With the ratio SI ($mm^2$)/Ts (mm) being 150 or less, the cross-sectional area SI is reduced with respect to the thickness Ts to keep heat from being retained in the noise reducer 9, which allows for further improving the tire durability. For the similar reasons, the ratio S1 ($mm^2$)/Ts (mm) is more preferably in a range from 50 to 120.

It should be noted that the material of the noise reducer 9, which only has to be controllable to allow a cavity resonance energy to be reduced as a result of the cavity resonance energy being relaxed, absorbed, converted into another energy (for example, a thermal energy), or the like, is not limited to the above-described sponge material and may be, for example, a non-woven fabric of an organic fiber or an inorganic fiber.

In a case where the noise reducer 9 is a sponge material as in the present embodiment, the sponge material may be a spongy porous structure, which includes, for example, a so-called sponge having interconnected cells resulting from foaming a rubber or a synthetic resin. Further, the sponge material includes, in addition to the above-described sponge, a web produced by entangling and integrally connecting an animal fiber, a plant fiber, a synthetic fiber, or the like. It should be noted that the above-described "porous structure" is not limited to a structure having interconnected cells and also includes a structure having closed cells. The sponge material as described above has voids formed on a surface thereof and inside, which converts a vibration energy of vibrating air into a thermal energy. This reduces cavity resonance in the tire cavity and, consequently, a road noise can be reduced.

Examples of a material of the sponge material include synthetic resin sponges such as an ether-based polyurethane sponge, an ester-based polyurethane sponge, a polyethylene sponge and rubber sponges such as a chloroprene rubber sponge (CR sponge), an ethylenepropylene rubber sponge (EPDM sponge), and a nitrile rubber sponge (NBR sponge). In terms of noise reduction performance, weight reduction, foaming adjustability, durability, etc., it is preferable that, for example, a polyurethane-based sponge including an ether-based polyurethane sponge or a polyethylene-based sponge be used.

A sum of the cross-sectional area of the noise reducer 9 in a tire width direction cross section is preferably in a range from 20 to 30000 ($mm^2$). With the sum of the cross-sectional area being 20 ($mm^2$) or more, the noise reduction performance can be further improved. With the sum of the cross-sectional area being 30000 ($mm^2$) or less, heat is kept from being retained in the noise reducer 9 to further improve the tire durability. For the similar reasons, the sum of the cross-sectional area is more preferably in a range from 100 ($mm^2$) to 20000 ($mm^2$), more preferably in a range from 1000 ($mm^2$) to 18000 ($mm^2$), more preferably in a range from 3000 ($mm^2$) to 15000 ($mm^2$).

As in the present embodiment, in a case where the noise reducer 9 is the sponge material, a hardness of the sponge material is preferably, but not limited to, in a range from 5 N to 450 N. With the hardness being 5 N or more, the noise reduction performance can be improved. With the hardness being 450 N or less, adhesiveness of the noise reducer can be increased. Likewise, the hardness of the noise reducer is preferably in a range from 8 to 300 N. Here, the "hardness" is a value measured in accordance with, among measurement methods in JIS K6400, Item 6, a method A in Item 6.3.

Further, a specific gravity of the sponge material is preferably in a range from 0.001 to 0.090. With the specific gravity of the sponge material being 0.001 or more, the noise reduction performance can be improved. With the specific gravity of the sponge material being 0.090 or less, a weight increase attributed to the sponge material can be reduced. Likewise, the specific gravity of the sponge material is more preferably in a range from 0.003 to 0.080. Here, the "specific gravity" is a value obtained by converging an apparent density to a specific gravity in accordance with a measurement method in JIS K6400, Item 5.

Further, a tensile strength of the sponge material is preferably in a range from 20 kPa to 500 kPa. With the tensile strength being 20 kPa or more, the adhesiveness can be improved. With the tensile strength being 500 kPa or less, productivity of the sponge material can be improved. Likewise, the tensile strength of the sponge material is more preferably in a range from 40 to 400 kPa. Here, the "tensile strength" is a value measured with a No. 1 dumbbell test piece in accordance with a measurement method in JIS K6400, Item 10.

Further, elongation at break of the sponge material is preferably in a range from 110% to 800%. With the elongation at break being 110% or more, generation of a crack in the sponge material can be reduced. With the elongation at break being 800% or less, the productivity of the sponge material can be improved. Likewise, the elongation at break of the sponge material is preferably in a range from 130% to 750%. Here, the "elongation at break" is a value measured with a No. 1 dumbbell test piece in accordance with a measurement method in JIS K6400, Item 10.

Further, a tear strength of the sponge material is preferably in a range from 1 to 130 N/cm. With the tear strength being 1 N/cm or more, the generation of a crack in the sponge material can be reduced. With the tear strength being 130 N/cm or less, manufacturability of the sponge material can be improved. Likewise, the tear strength of the sponge material is preferably in a range from 3 to 115 N/cm. Here, the "tear strength" is a value measured with a No. 1 test piece in accordance with JIS K6400, Item 11.

Further, a foaming rate of the sponge material is preferably in a range from 1% to 40%. With the foaming rate being 1% or more, the noise reduction performance can be improved. With the foaming rate being 40% or less, the productivity of the sponge material can be improved. Likewise, the foaming rate of the sponge material is preferably in a range from 2 to 25%. Here, the "foaming rate" is a value obtained by subtracting 1 from a ratio A/B of a specific gravity A of a solid phase portion of the sponge material to a specific gravity B of the sponge material and multiplying the resulting value by 100.

Further, a mass of the sponge material is preferably in a range from 5 to 800 g. With the mass being 5 g or more, the noise reduction performance can be reduced. With the mass being 800 g or less, a weight increase attributed to the sponge material can be reduced. Likewise, the mass of the sponge material is preferably in a range from 20 to 600 g.

Description will be made below on workings and effects of the pneumatic radial tire for passenger vehicles of the present embodiment according to the first to third aspects of the present disclosure.

In the pneumatic radial tire for passenger vehicles of the present embodiment, the sectional width SW of the tire and the outer diameter OD of the tire satisfy the predetermined relationship described above (that is to say: in the first aspect, the sectional width SW of the tire is less than 165 (mm) and the ratio SW/OD between the sectional width SW and the outer diameter OD of the tire is 0.26 or less; in the second aspect, the sectional width SW of the tire is 165 (mm) or more and a relational expression: OD (mm) 2.135× SW (mm)+282.3 is satisfied by the sectional width SW (mm) and the outer diameter OD (mm) of the tire; and in the third aspect, a relational expression: OD (mm)≥−0.0187×SW (mm)$^2$+9.15×SW (mm)−380 is satisfied). This allows for improving the fuel efficiency as described above.

Figure 3:
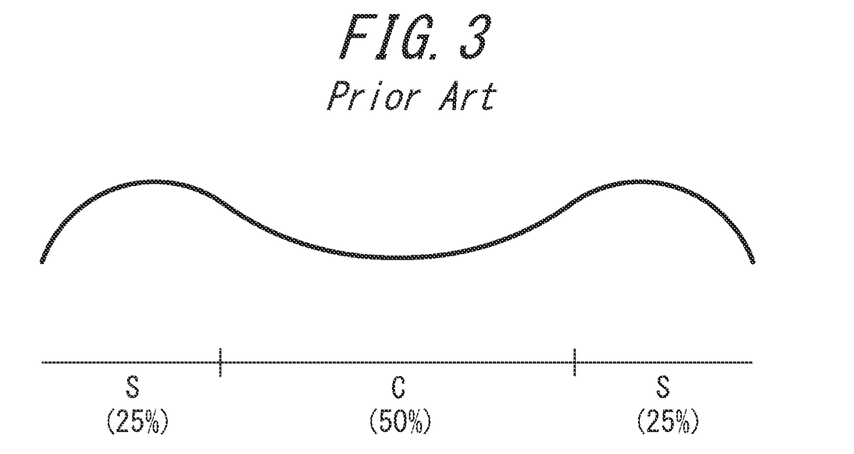
FIG. 3 schematically illustrates a ground contact pressure distribution of a tire with a typical tire size.
Figure 4:
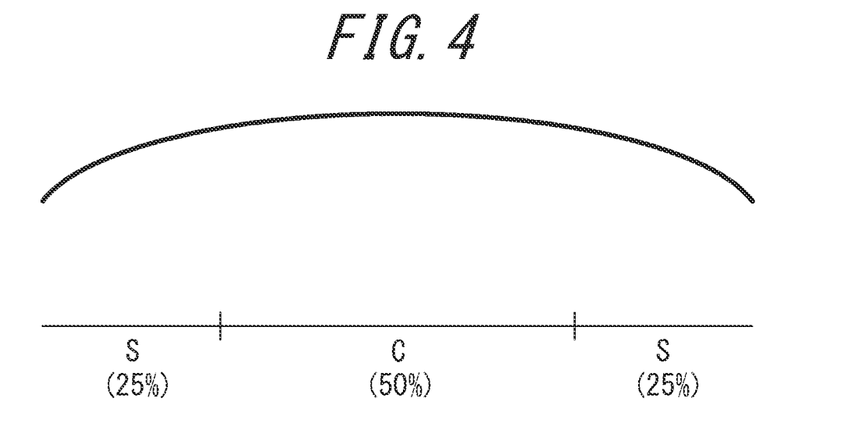
FIG. 4 schematically illustrates a ground contact pressure distribution of a narrow-width large-diameter tire.

In this regard, as described above, as schematically illustrated in FIG. 3 and FIG. 4, a pneumatic radial tire for passenger vehicles with a typical tire size tends to have a high ground contact pressure in the shoulder regions S as compared with in the center region C, whereas a narrow-width large-diameter pneumatic radial tire for passenger vehicles with the sectional width SW and the outer diameter OD of the tire satisfying the above-described predetermined relationship tends to have an equal or high ground contact pressure in the center region C as compared with in the shoulder regions S. Thus, it has been found that a narrow-width large-diameter pneumatic radial tire for passenger vehicles with the sectional width SW and the outer diameter OD of the tire satisfying the above-described predetermined relationship has a relatively large heat buildup in the center region C and a relatively small heat buildup in the shoulder regions S.

Accordingly, in the pneumatic radial tire for passenger vehicles of the present embodiment, the at least one noise reducer 9 is provided on the tire inner surface 7, the noise reducer 9 being provided on the tire inner surface 7 at least in the center region C and the shoulder regions S. Further, regarding the thickness of the noise reducer 9 measured in the direction perpendicular to the tire inner surface 7, the maximum thickness Ts in the shoulder regions S, in which heat buildup is relatively small, is larger than the maximum thickness Tc in the center region C.

Thus, in the narrow-width large-diameter pneumatic radial tire for passenger vehicles, in which the noise reduction performance is improved by providing the noise reducer 9 on the tire inner surface 7 at least in the center region C and the shoulder regions S and increasing the thickness of the noise reducer 9, in particular, in the shoulder regions S as compared with in the center region C and the sectional width SW and the outer diameter OD of the tire satisfy the above-described predetermined relationship, heat is prevented from being excessively retained in the noise reducer 9 by virtue of the thickness of the noise reducer 9 in the center region C being reduced (as compared with in the shoulder regions S).

Further, while the noise reduction performance is improved by virtue of the thickness of the noise reducer 9 in the shoulder regions S being increased (as compared with in center region C), the tire durability can be enhanced by preventing heat from being excessively retained in the noise reducer 9 (as compared with in a tire having a typical shape) by virtue of heat buildup in the shoulder regions S being relatively small.

In the present embodiment, no noise reducer 9 is provided in a region on the tire width direction outer side relative to each of the shoulder regions S, which allows for further preventing heat from being retained in the noise reducer 9 and reducing a weight increase attributed to the noise reducer 9.

Here, the above-described predetermined relationship between the sectional width SW of the tire and the tire outer diameter OD is preferably satisfied at an internal pressure of 200 kPa or more, more preferably at 220 kPa or more, further preferably at 280 kPa or more. This is because the rolling resistance can be further reduced. Simultaneously, as described above, the above-described predetermined relationship between the sectional width SW of the tire and the tire outer diameter OD is preferably satisfied at an internal pressure of 350 kPa or less. This is because ride comfort can be improved.

Further, in the present embodiment, the sponge material is used as the noise reducer 9. The sponge material can exhibit a high noise reduction performance irrespective of a small specific gravity thereof, which allows for further improving the noise reduction performance with the weight not being excessively increased.

As described above, the pneumatic radial tire for passenger vehicles according to the present embodiment of the first to third aspects of the present disclosure can exhibit both noise reduction performance and tire durability.

Figure 5:
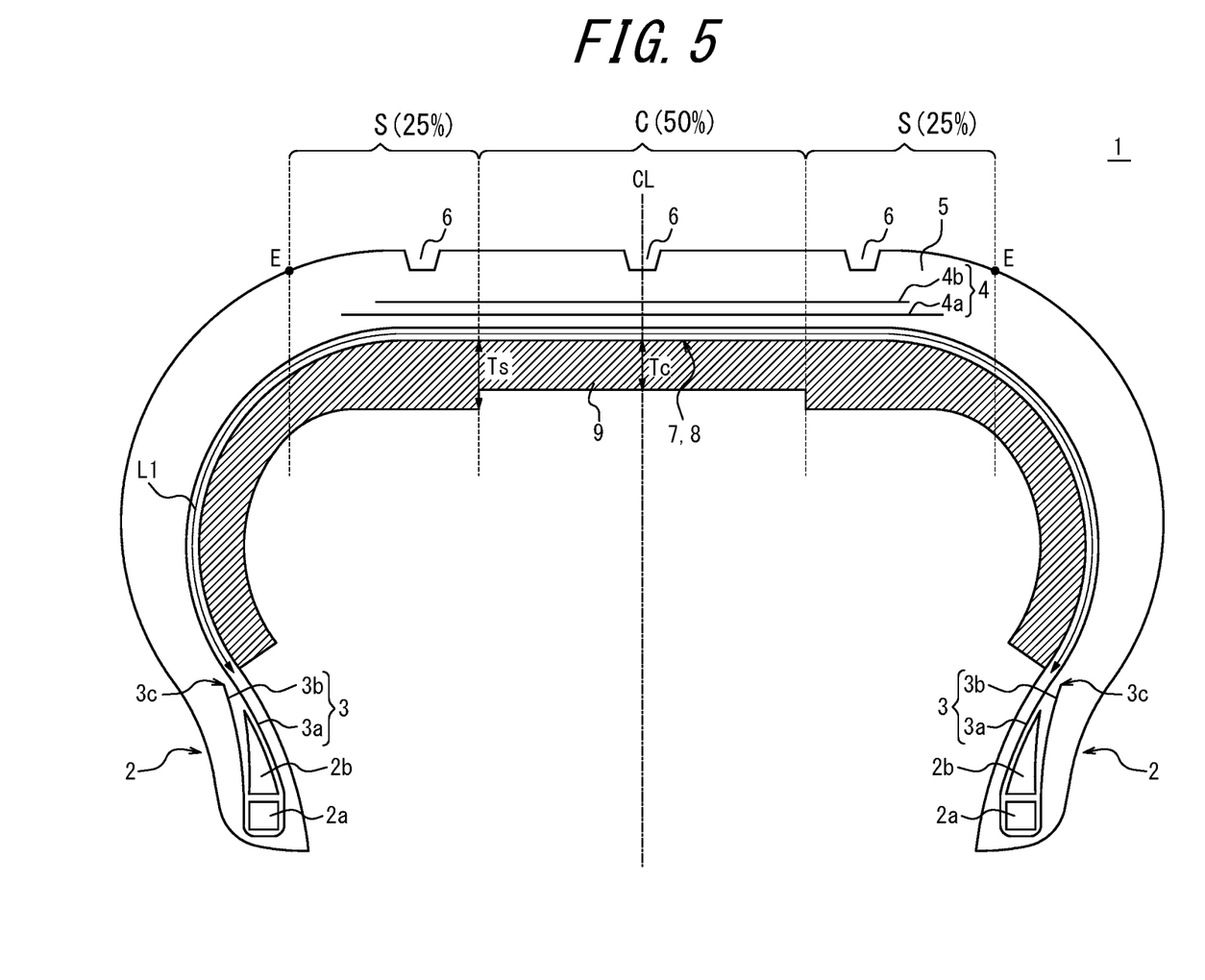
FIG. 5 is a tire width direction cross sectional view, illustrating a pneumatic radial tire for passenger vehicles according to another embodiment of the first to third aspects of the present disclosure.

FIG. 5 is a tire width direction cross sectional view, illustrating a pneumatic radial tire for passenger vehicles according to another embodiment of the first to third aspects of the present disclosure. FIG. 5 illustrates a width direction cross section of the tire, the tire being mounted on the rim and filled with a prescribed internal pressure with no load applied.

The tire of the other embodiment illustrated in FIG. 5 is different only in the arrangement and the size of the noise reducer 9 from the tire of the previous embodiment illustrated in FIG. 2. Accordingly, relevant components will be described below and other common components are not described.

In other words, the tire of the embodiment illustrated in FIG. 5 is different from the tire of the embodiment illustrated in FIG. 2 in that the at least one noise reducer 9 is provided also on the tire inner surface 7 and extends in the region on the tire width direction outer side of at least one of the shoulder regions S to a position on the tire radial direction inner side of the position of the sectional width SW of the tire. Further, the thickness of the noise reducer 9 in the region on the tire width direction outer side of each of the shoulder regions S is substantially constant and substantially equal to the thickness of the noise reducer 9 at the tire width direction outer edge of each of the shoulder regions S.

The tire of the embodiment illustrated in FIG. 5, in which the noise reducer 9 provided on the tire inner surface 7 in the region on the tire width direction outer side of each of the shoulder regions S enables increasing the volume of the noise reducer 9, can be further improved in noise reduction performance as compared with the tire of the embodiment illustrated in FIG. 2.

Figure 6:
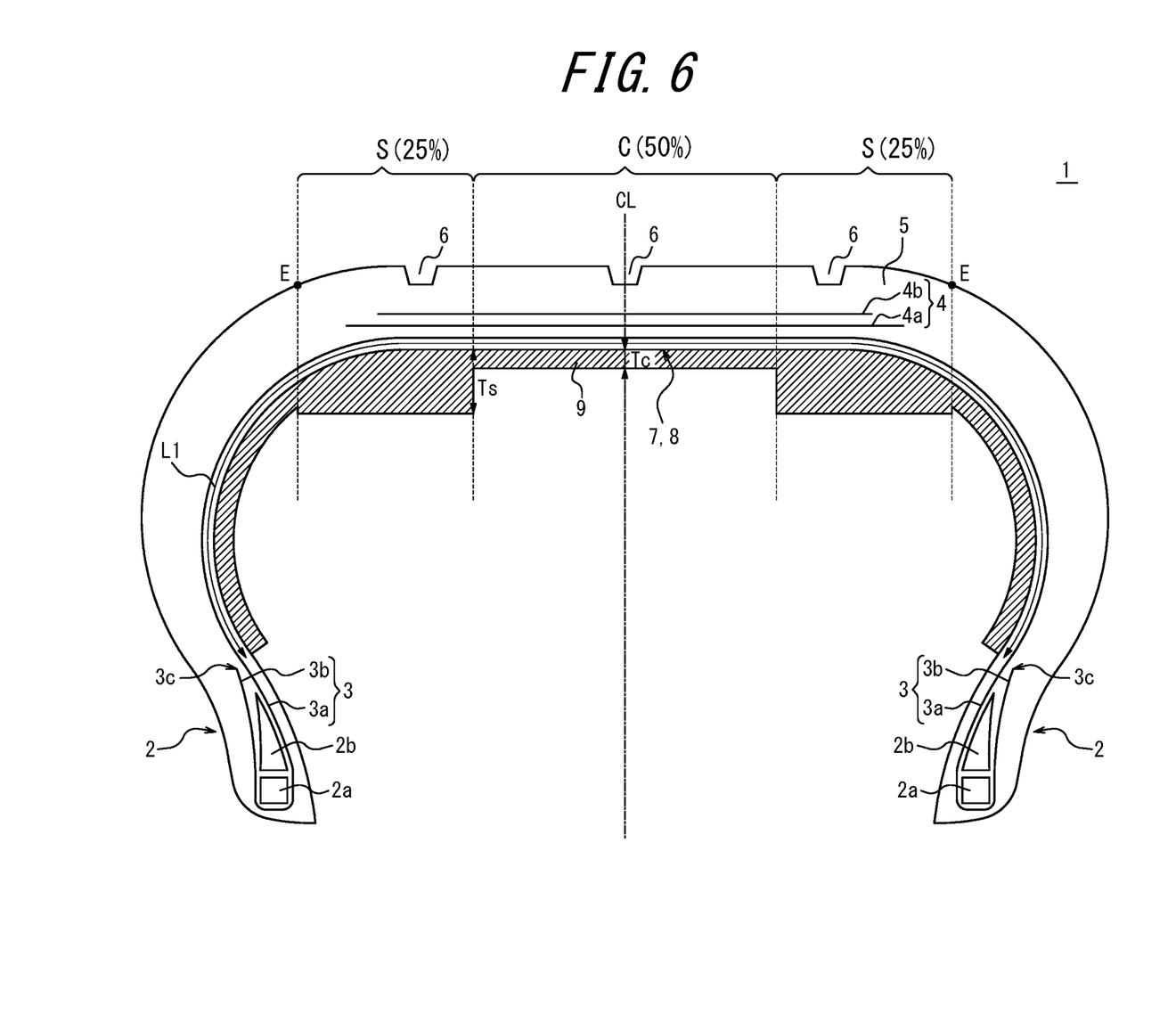
FIG. 6 is a tire width direction cross sectional view, illustrating a pneumatic radial tire for passenger vehicles according to still another embodiment of the first to third aspects of the present disclosure.

FIG. 6 is a tire width direction cross sectional view, illustrating a pneumatic radial tire for passenger vehicles according to still another embodiment of the first to third aspects of the present disclosure. FIG. 6 illustrates a width direction cross section of the tire, the tire being mounted on the rim and filled with a prescribed internal pressure with no load applied.

The tire of the other embodiment illustrated in FIG. 6 is different only in the arrangement and the size of the noise reducer 9 from the tire of the previous embodiment illustrated in FIG. 2. Accordingly, a relevant components will be described below and other common components are not described.

In other words, the tire of the embodiment illustrated in FIG. 6 is different from the tire of the embodiment illustrated in FIG. 2 in that the at least one noise reducer 9 is provided also on the tire inner surface 7 and extends in the region on the tire width direction outer side of at least one of the shoulder regions S to a position on the tire radial direction inner side of the position of the sectional width SW of the tire. Further, the thickness of the noise reducer 9 in the region on the tire width direction outer side of each of the shoulder regions S is substantially constant and substantially equal to the maximum thickness Tc of the noise reducer 9 in the center region C.

The tire of the embodiment illustrated in FIG. 6, in which the noise reducer 9 provided on the tire inner surface 7 in the region on the tire width direction outer side of each of the shoulder regions S is small in thickness (as compared with in the embodiment illustrated in FIG. 3), can be improved in tire durability by virtue of preventing heat from being retained in the noise reducer 9 as compared with the tire of the embodiment illustrated in FIG. 5.

In the present disclosure, the ratio Ts/Tc of the maximum thickness Ts of the noise reducer 9 in the shoulder regions S to the maximum thickness Tc of the noise reducer 9 in the center region C is preferably in a range from 1.1 to 2.0.

With the above-described ratio Ts/Tc being 1.1 or more, the above-described effects are further obtainable. Simultaneously, with the ratio Ts/Tc being 2.0 or less, heat can be kept from being retained in the noise reducer 9 in the shoulder regions S further as much as possible.

For the similar reasons, the ratio Ts/Tc is more preferably in a range from 1.2 to 1.9, further preferably in a range from 1.3 to 1.8.

Further, in the present disclosure, the noise reducer 9 is preferably a sponge material. This is because a sponge material, which is small in specific gravity, can improve the noise reduction performance without an excessive weight increase.

<Tire-Rim Assembly>

A tire-rim assembly herein is provided by attaching the pneumatic radial tire for passenger vehicles of the embodiments of the above-described first to third aspects to the rim. The tire-rim assembly of the present example can achieve workings and effects similar to those described in relation to the pneumatic radial tire for passenger vehicles according to the embodiments of the above-described first to third aspects.

In this regard, an internal pressure of the tire-rim assembly is preferably 200 kPa or more, more preferably 220 kPa or more, further preferably 280 kPa or more. This is because a high internal pressure can further reduce the rolling resistance. Simultaneously, the internal pressure of the tire-rim assembly is preferably 350 kPa or less. This is because ride comfort can be improved.

<Method of Using Pneumatic Radial Tire for Passenger Vehicles>

A method of using a pneumatic radial tire for passenger vehicles herein is intended for the use of the pneumatic radial tire for passenger vehicles according to the embodiments of the above-described first to third aspects. The method of using the pneumatic radial tire for passenger vehicles of the present example can achieve workings and effects similar to those described in relation to the pneumatic radial tire for passenger vehicles according to the embodiments of the above-described first to third aspects. In this regard, an internal pressure is preferably 200 kPa or more in use, more preferably 220 kPa or more in use, further preferably 280 kPa or more in use. This is because a high internal pressure can further reduce the rolling resistance. Simultaneously, the internal pressure is preferably 350 kPa or less in use. This is because ride comfort can be improved.

Hereinabove, the embodiments of the present disclosure are described but the present disclosure is by no means limited to the above-described embodiments. For example, in the embodiments illustrated in FIG. 2, FIG. 5, and FIG. 6, the noise reducer 9 is symmetric with respect to the boundary, i.e., the tire equator plane CL; however, the noise reducer 9 may be asymmetric. For example, any one or more of the position, extending region, shape, material, maximum width, maximum thickness, etc. of the noise reducer 9 in one of the half portions in the tire width direction may be different from that of the noise reducer 9 in the other half portion in the tire width direction.

Here, in the tire-rim assembly, it is preferable that: SW be less than 165 mm and the ratio SW/OD be 0.26 or less; the internal pressure be 200 kPa or more; the aspect ratio be 70 or less; and the rim diameter be 18 inches or more and a circumferential length of the noise reducer (for example, the sponge material) be 1800 mm or more.

The "circumferential length of the noise reducer" herein refers to a circumferential length at a position where a minimum of the circumferential length of the noise reducer is measured in the tire circumferential direction or, in a case where the noise reducer is divided into a plurality of noise reducers, a circumferential length of one of the plurality of noise reducers that has a minimum circumferential length. Further, in a case where the noise reducer is discontinuous in the tire circumferential direction, the "circumferential length of the noise reducer" refers to a total circumferential length.

To improve the fuel efficiency, it is preferable that the internal pressure be increased to reduce the rolling resistance, it is also preferable that the aspect ratio be reduced for weight reduction or tire deformation be reduced, and it is also preferable that the sectional width of the tire be reduced to reduce the air resistance.

However, setting the internal pressure high increases the ground contact pressure on the tread surface, so that the cavity resonance noise tends to worsen. Further, a reduction in the aspect ratio increases a belt tension, which makes the ground contact pressure on the tread surface high, so that the cavity resonance noise tends to worsen. Further, the tread width is reduced with a reduction in the sectional width of the tire, which usually reduces the cross-sectional area of the noise reducer. The cavity resonance thus tends to worsen.

Accordingly, the circumferential length of the noise reducer is increased by increasing the outer diameter of the tire to increase the total volume of the noise reducer without increasing the cross-sectional area of the noise reducer, which allows for reducing the cavity resonance. Further, by virtue of the small cross-sectional area of the noise reducer, an amount of heat buildup of the noise reducer can also be reduced.

As is understood from the above, the above-described configuration allows for achieving a reduction in the cavity resonance, a reduction in the rolling resistance, and a heat buildup durability at a high level.

In the tire-rim assembly, it is likewise preferable that: SW be 165 mm or more and OD (mm)≥2.135×SW (mm)+282.3 be satisfied; the internal pressure be 200 kPa or more; the aspect ratio be 70 or less; and the rim diameter be 18 inches or more and the circumferential length of the noise reducer (for example, the sponge material) be 1800 mm or more.

Further, in the tire-rim assembly, it is likewise preferable that: OD (mm)≥−0.0187×SW (mm)$^2$+9.15×SW (mm)−380 be satisfied; the internal pressure be 200 kPa or more; the aspect ratio be 70 or less; and the rim diameter be 18 inches or more and the circumferential length of the noise reducer (for example, the sponge material) be 1800 mm or more.

REFERENCE SIGNS LIST

1 Pneumatic radial tire for passenger vehicles (Tire)
2 Bead portion
2a Bead core
2b Bead filler
3 Carcass
4 Belt
4a, 4b Belt layer
5 Tread
6 Circumferential main groove
7 Tire inner surface
8 Inner liner
9 Noise reducer
CL Tire equator plane
E Ground edge
C Center region
S Shoulder region

The invention claimed is:

1. A pneumatic radial tire for passenger vehicles, the pneumatic radial tire comprising a carcass toroidally spanning between a pair of bead portions, the carcass including plies of radially arranged cords, wherein
   a sectional width SW of the tire is less than 165 mm and a ratio SW/OD between the sectional width SW and an outer diameter OD in mm of the tire is 0.26 or less,
   at least one noise reducer is provided on an inner surface of the tire,
   assuming that when the tire is mounted on a rim and filled with a prescribed internal pressure in a load-free state, there are defined, in a tire width direction cross section, a center region and shoulder regions, the center region being a tire width direction region accounting for 50% at a tire width direction middle between ground edges, the shoulder regions being tire width direction regions accounting for 25% each on both tire width direction outer sides between the ground edges relative to the center region,
   the at least one noise reducer is provided on the inner surface of the tire at least in the center region and the shoulder regions,
   among thicknesses of the at least one noise reducer measured in a direction perpendicular to the inner surface of the tire, each shoulder region has a thickness at its tire width direction outer edge and a maximum thickness Ts in each shoulder region is larger than a maximum thickness Tc in the center region,
   the at least one noise reducer extends in the region on the tire width direction outer side of at least one of the shoulder regions to a position on the tire radial direction inner side of the position of the sectional width SW of the tire,
   an entirety in the tire width direction of the at least one noise reducer contacts with the inner surface of the tire, and
   in the region on the tire width direction outer side of the at least one of the shoulder regions, the at least one noise reducer has a constant thickness equal to either the maximum thickness Tc in the center region or the thickness at the respective tire the width direction outer edge of the at least one of the shoulder regions.

2. The pneumatic radial tire for passenger vehicles according claim 1 wherein a ratio Ts/Tc of the maximum thickness Ts of the noise reducer in each shoulder region to the maximum thickness Tc of the noise reducer in the center region C is in a range from 1.1 to 2.0.

3. The pneumatic radial tire for passenger vehicles according to claim 2, wherein the noise reducer is a sponge material.

4. The pneumatic radial tire for passenger vehicles according to claim 1, wherein the noise reducer is a sponge material.

5. A pneumatic radial tire for passenger vehicles, the pneumatic radial tire comprising a carcass toroidally spanning between a pair of bead portions, the carcass including plies of radially arranged cords, wherein
   a sectional width SW of the tire is 165 mm or more and the sectional width SW and an outer diameter OD in mm of the tire satisfy a relational expression:

$OD \geq 2.135 \times SW + 282.3$, at least one noise reducer is provided on an inner surface of the tire,
   assuming that when the tire is mounted on a rim and filled with a prescribed internal pressure in a load-free state, there are defined, in a tire width direction cross section, a center region and shoulder regions, the center region being a tire width direction region accounting for 50% at a tire width direction middle between ground edges, the shoulder regions being tire width direction regions accounting for 25% each on both tire width direction outer sides between the ground edges relative to the center region, the at least one noise reducer is provided on the inner surface of the tire at least in the center region and the shoulder regions, among thicknesses of the at least one noise reducer measured in a direction perpendicular to the A inner surface of the tire, each shoulder region has a thickness at the tire width direction outer edge and a maximum thickness Ts in each shoulder region is larger than a maximum thickness Tc in the center region, the at least one noise reducer extends in the region on the tire width direction outer side of at least one of the shoulder regions to a position on the tire radial direction inner side of the position of the sectional width SW of the tire, an entirety in the tire width direction of the at least one noise reducer contacts with the inner surface of the tire, and in the region on the tire width direction outer side of the at least one of the shoulder regions, the at least one noise reducer has a constant thickness equal to either the maximum thickness Tc in the center region or the thickness at the respective tire width direction outer edge of the at least one of the shoulder regions.

6. The pneumatic radial tire for passenger vehicles according claim 5, wherein a ratio Ts/Tc of the maximum thickness Ts of the noise reducer in each shoulder region to the maximum thickness Tc of the noise reducer in the center region C is in a range from 1.1 to 2.0.

7. The pneumatic radial tire for passenger vehicles according to claim 5, wherein the noise reducer is a sponge material.

8. A pneumatic radial tire for passenger vehicles, the pneumatic radial tire comprising a carcass toroidally spanning between a pair of bead portions, the carcass including plies of radially arranged cords, wherein a sectional width SW in mm and an outer diameter OD in mm of the tire satisfy a relational expression:

$$OD \geq -0.0187 \times SW^2 + 9.15 \times SW - 380,$$

at least one noise reducer is provided on an inner surface of the tire, assuming that when the tire is mounted on a rim and filled with a prescribed internal pressure in a load-free state, there are defined, in a tire width direction cross section, a center region and shoulder regions, the center region being a tire width direction region accounting for 50% at a tire width direction middle between ground edges, the shoulder regions being tire width direction regions accounting for 25% each on both tire width direction outer sides between the ground edges relative to the center region, the at least one noise reducer is provided on the inner surface of the tire at least in the center region and the shoulder regions, among thicknesses of the at least one noise reducer measured in a direction perpendicular to the inner surface of the tire, each shoulder region has a thickness at its tire width direction outer edge and a maximum thickness Ts in each shoulder region is larger than a maximum thickness Tc in the center region, the at least one noise reducer extends in the region on the tire width direction outer side of at least one of the shoulder regions to a position on the tire radial direction inner side of the position of the sectional width SW of the tire, an entirety in the tire width direction of the at least one noise reducer contacts with the inner surface of the tire, and in the region on the tire width direction outer side of the at least one of the shoulder regions, the at least one noise reducer has a constant thickness equal to either the maximum thickness Tc in the center region or the thickness at the respective tire width direction outer edge of the at least one of the shoulder regions.

9. The pneumatic radial tire for passenger vehicles according claim 8, wherein a ratio Ts/Tc of the maximum thickness Ts of the noise reducer in each shoulder region to the maximum thickness Tc of the noise reducer in the center region C is in a range from 1.1 to 2.0.

10. The pneumatic radial tire for passenger vehicles according to claim 8, wherein the noise reducer is a sponge material.

* * * * *